United States Patent [19]
Brown et al.

[11] 3,842,984
[45] Oct. 22, 1974

[54] CRANE COUNTERBALANCING TRAILER ASSEMBLY

[75] Inventors: Archer W. Brown, Mendota Heights; James L. Montgomery, St. Paul, both of Minn.

[73] Assignee: American Hoist & Derrick Company, St. Paul, Minn.

[22] Filed: Dec. 11, 1972

[21] Appl. No.: 313,762

Related U.S. Application Data

[63] Continuation-in-part of Ser. No. 102,500, Dec. 29, 1970, which is a continuation of Ser. No. 767,670, Oct. 15, 1968, abandoned.

[52] U.S. Cl. ................. 212/49, 212/58 R, 212/145, 280/103
[51] Int. Cl. ............................................ B66c 23/76
[58] Field of Search ...... 91/411 R; 212/49, 58, 145; 280/103, 111

[56] References Cited
UNITED STATES PATENTS

| | | | |
|---|---|---|---|
| 2,232,549 | 2/1941 | McNamara | 280/111 |
| 2,820,644 | 1/1958 | Smith | 280/103 |
| 3,037,643 | 6/1962 | Herman | 212/145 |
| 3,209,920 | 10/1965 | De Cuir | 212/58 |
| 3,602,326 | 8/1971 | Garrison | 91/413 X |

FOREIGN PATENTS OR APPLICATIONS

| | | | |
|---|---|---|---|
| 1,246,969 | 8/1967 | Germany | 212/49 |
| 214,777 | 5/1968 | U.S.S.R. | 212/49 |

*Primary Examiner*—James B. Marbert
*Assistant Examiner*—Jeffrey V. Nase

[57] ABSTRACT

In connection with a crane having a movable car body supported on a supporting surface, a crane deck pivotally mounted on the car body about a vertical axis, a boom and a mast pivotally mounted on the crane deck for independent movement in a common vertical plane, and linkages between the rear of the deck and the mast and between the mast and the boom; a counterbalancing trailer assembly is pivotally connected to the crane deck by a pair of arms for limited movement in a vertical plane. The trailer assembly includes a counterweight trailer which includes a means for holding ballast and which is supported on the supporting surface by a plurality of wheel assemblies. A third linkage between the trailer assembly and an upper portion of the mast is of length to insure that a portion of the boom load is supported by the trailer assembly. Each wheel assembly includes a wheel support means which is mounted to the trailer to be rotatable on a vertical axis, and each has ground engaging wheels and releasable means to hold the wheel support means to position the wheels either in first selected arcuate positions so that the track of the wheels over the ground will describe an arc concentric with the pivot point of the crane deck, or in second selected positions whereby the wheels all rotate on axes which are mutually parallel. Manual means or hydraulic piston-cylinder motors can be used to move the wheel support means between the first and the second positions. The trailer assembly includes means to insure that the weight load of that assembly is distributed over the ground engaging wheels in such a manner as to insure that the trailer assembly frame will not be subjected to excessive working forces.

10 Claims, 19 Drawing Figures

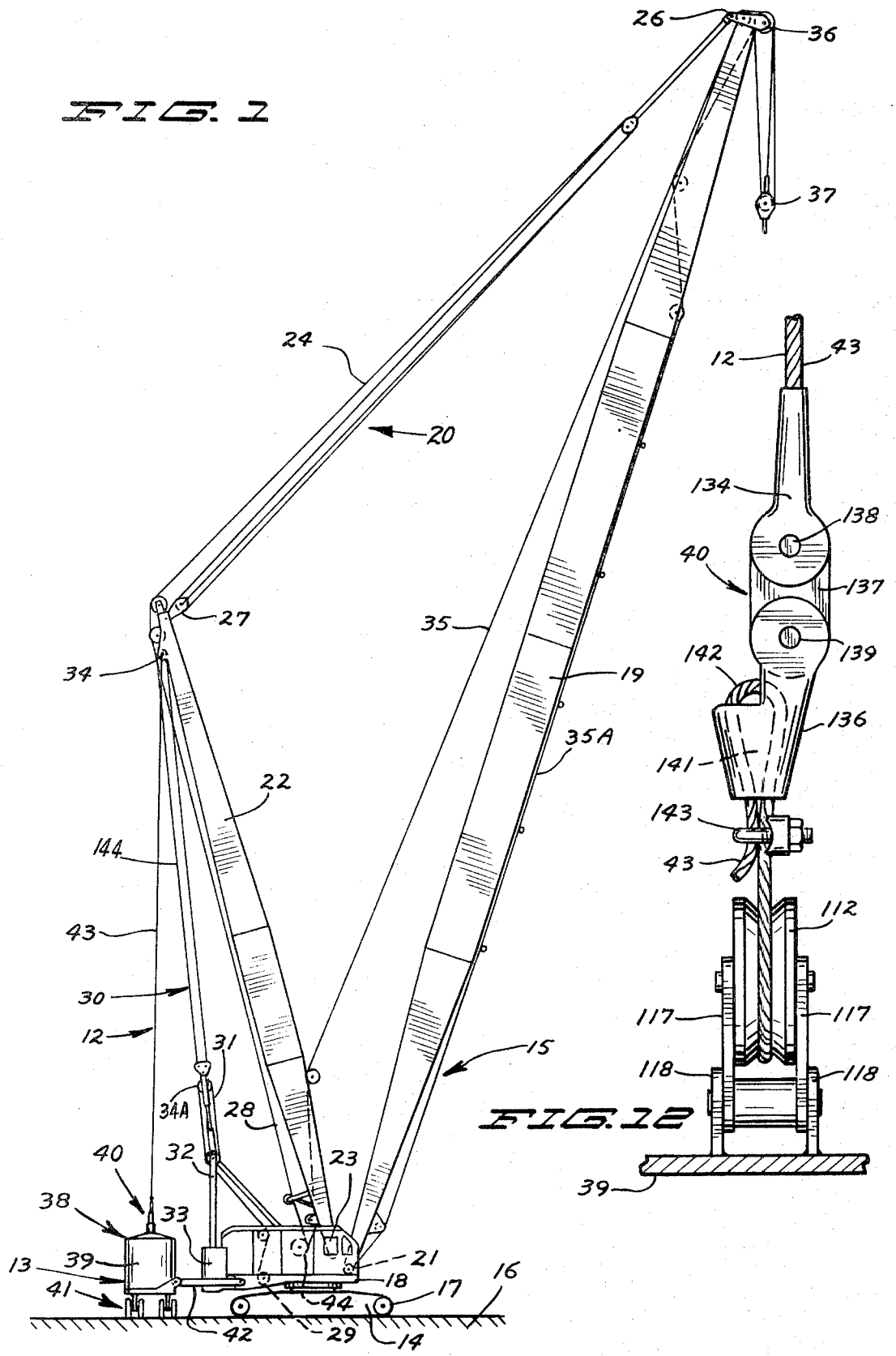

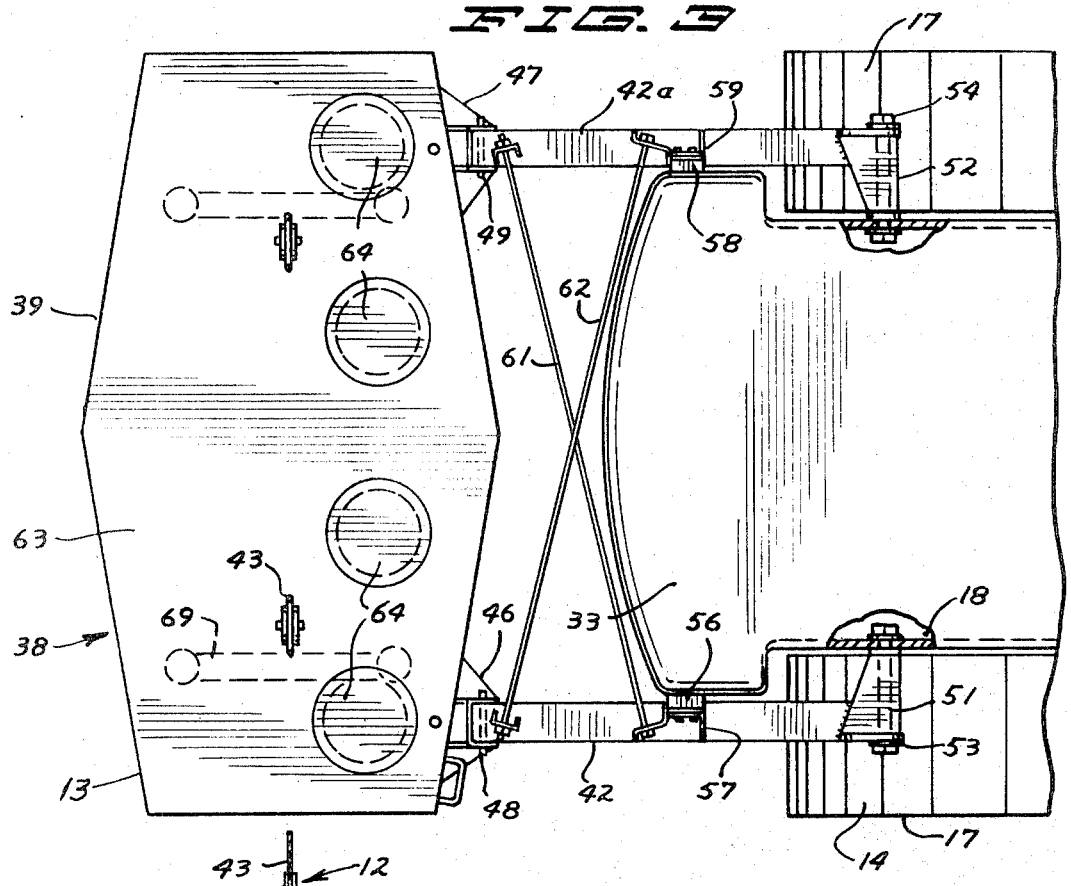
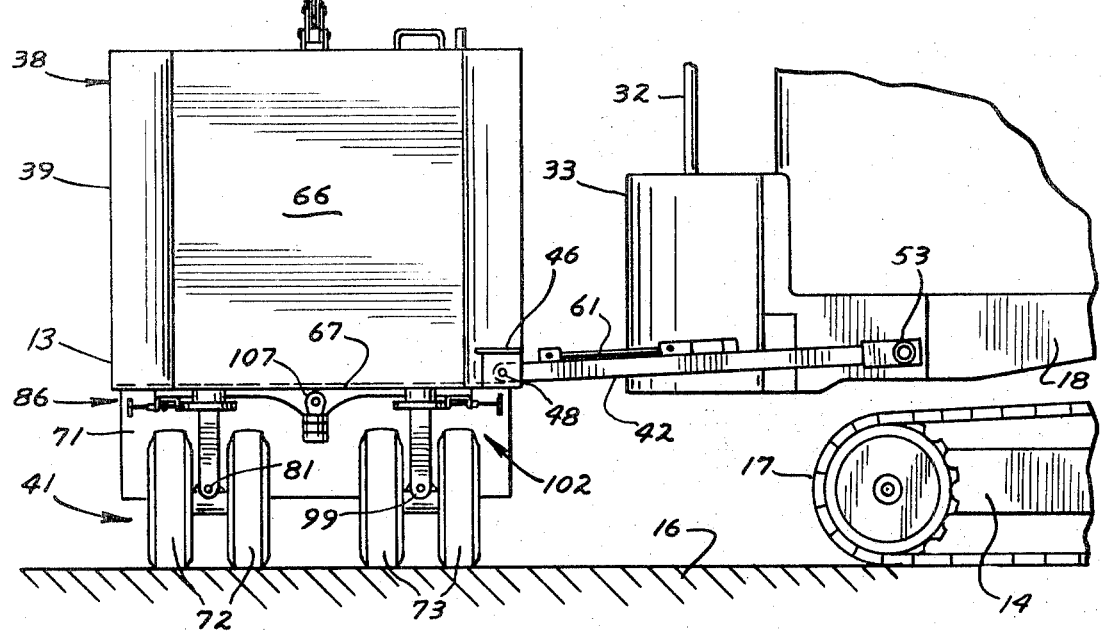

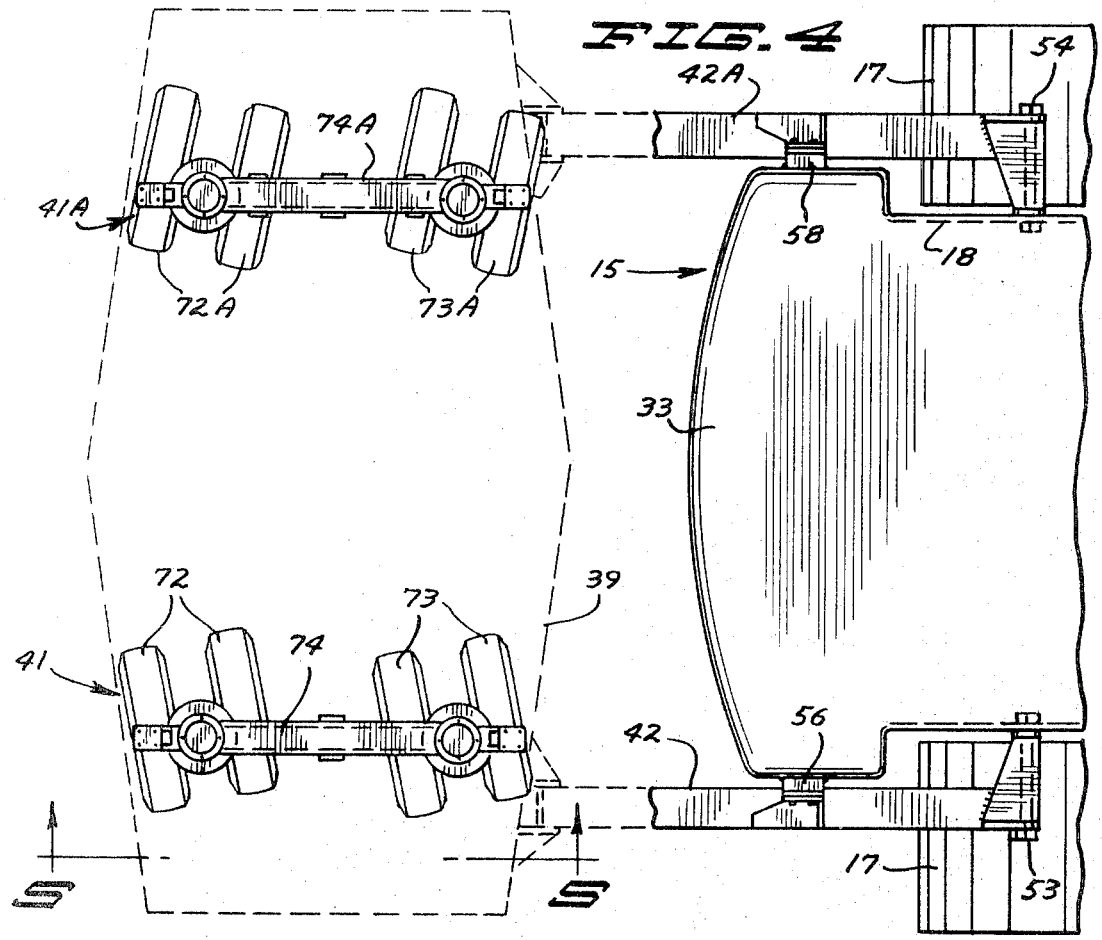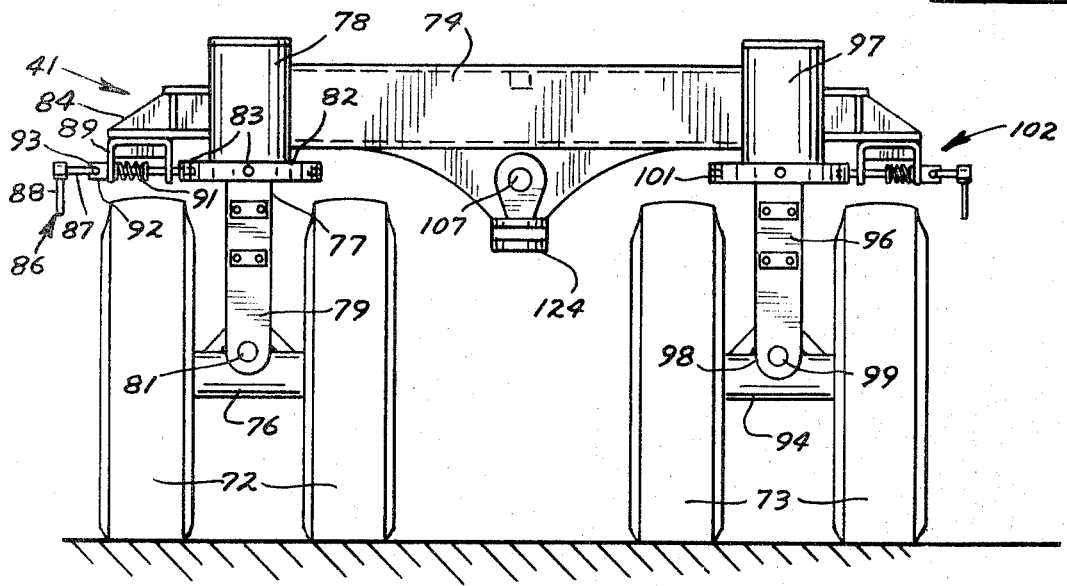

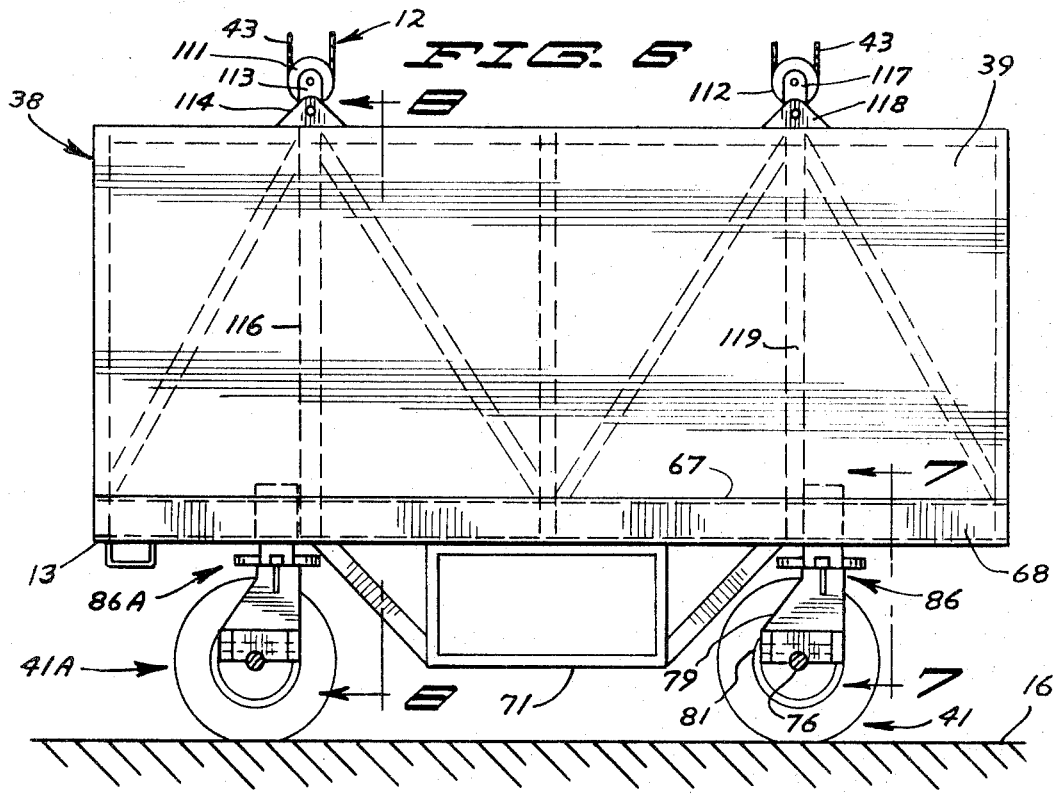
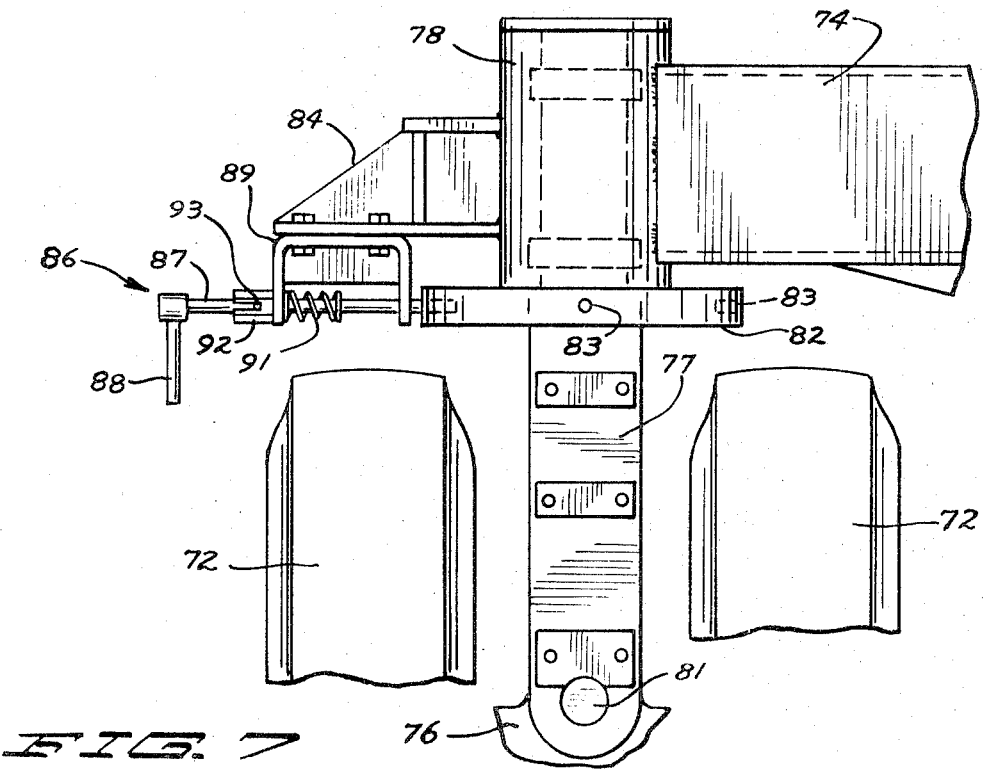

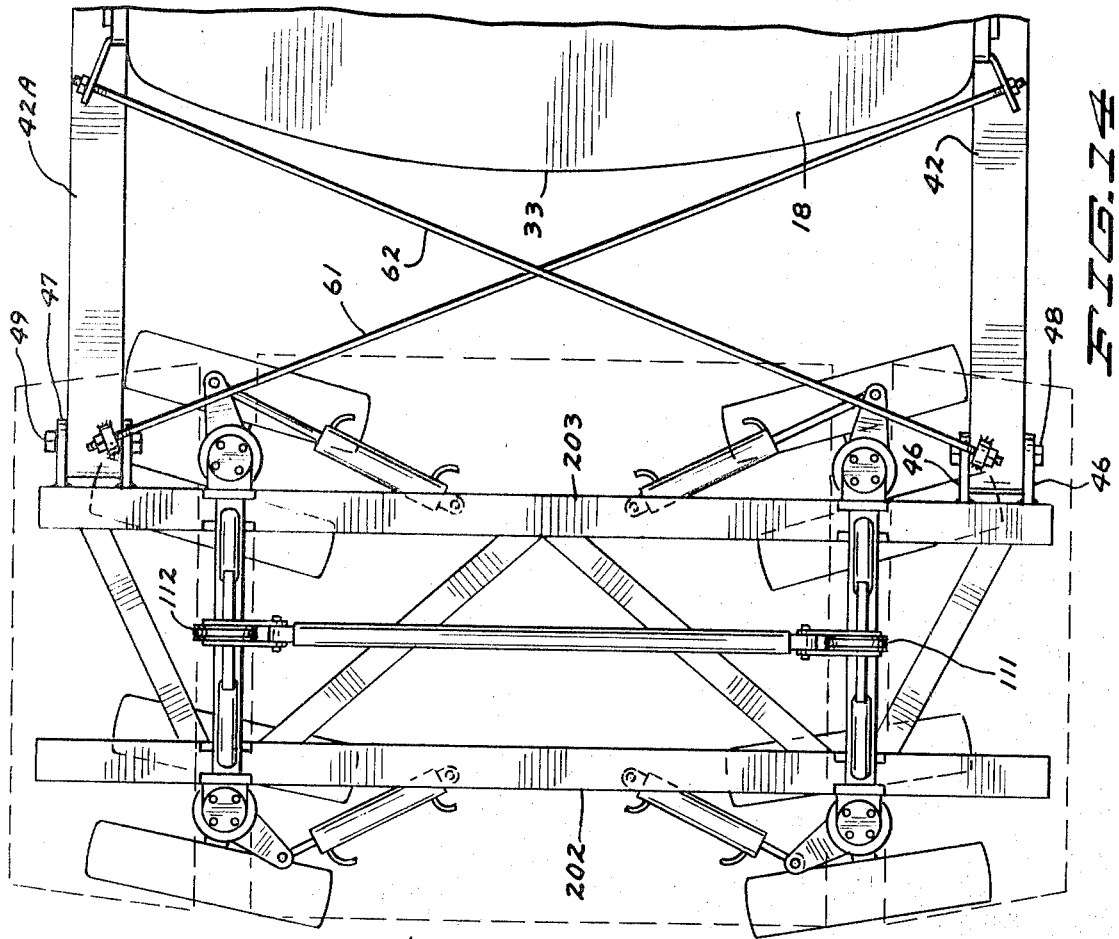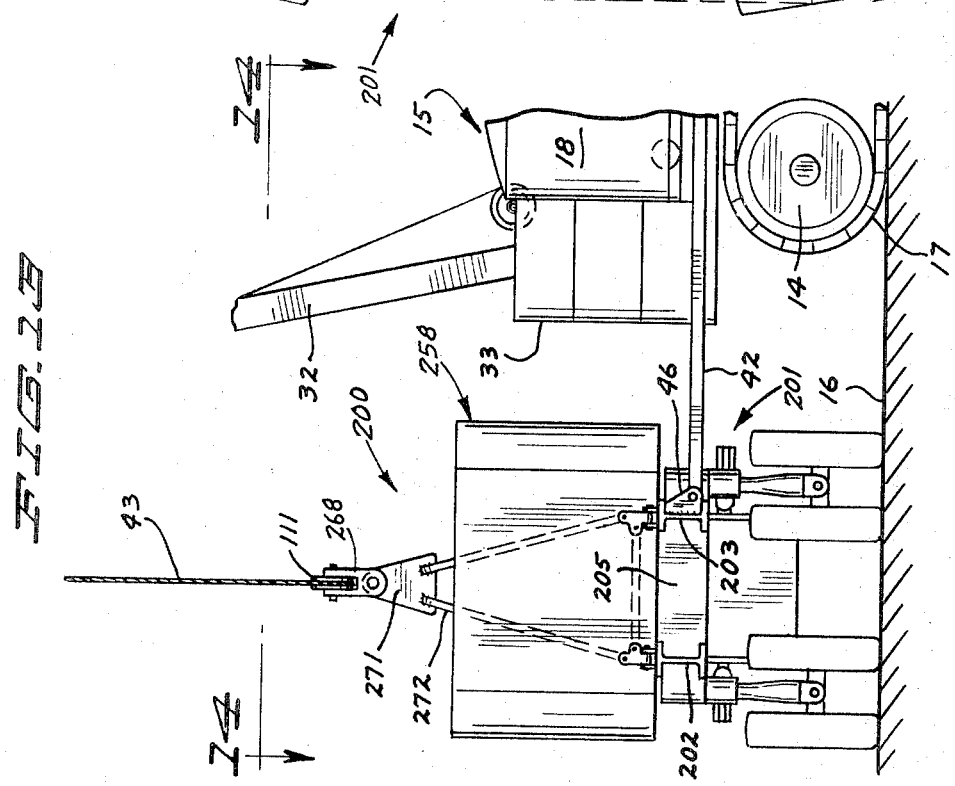

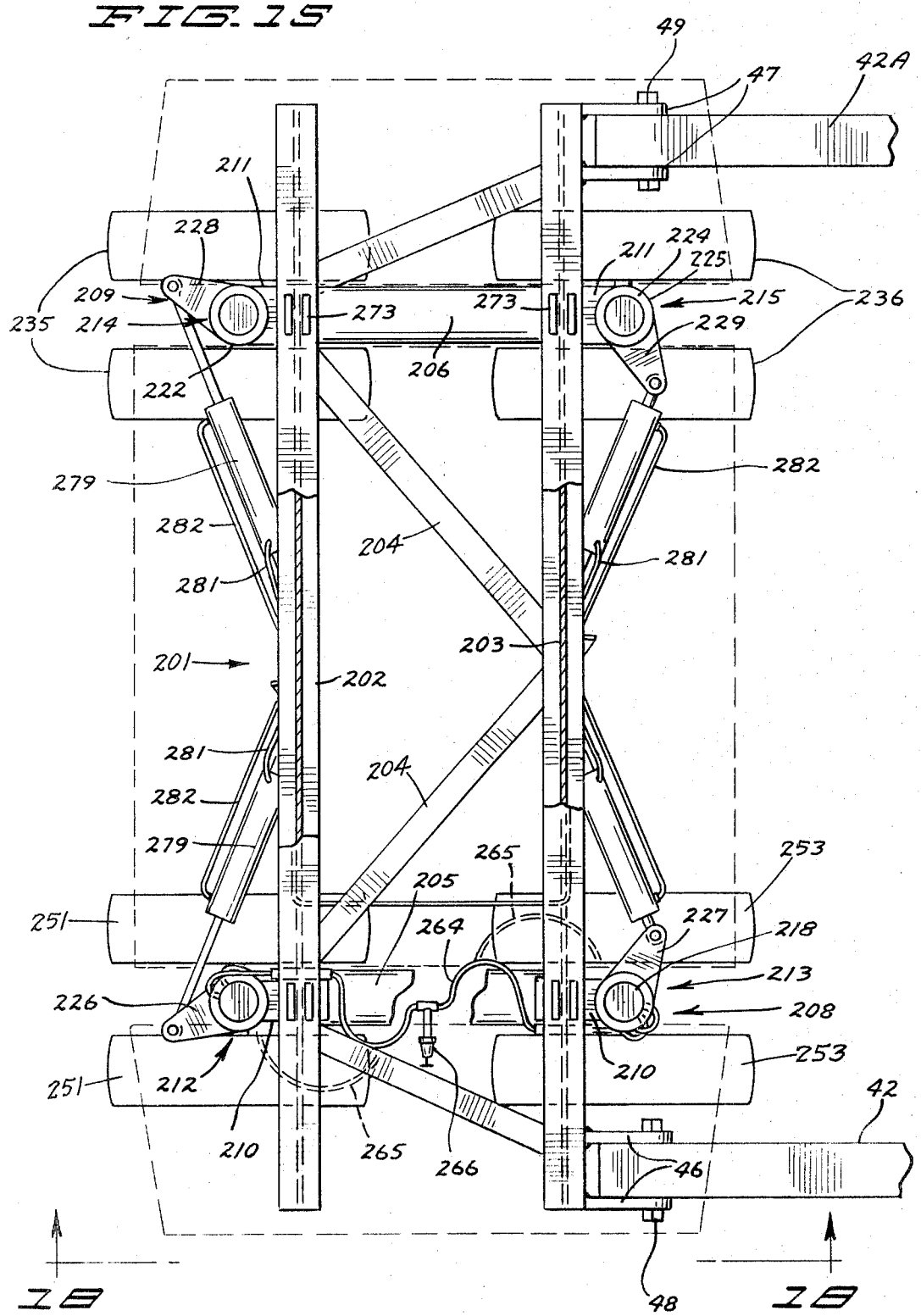

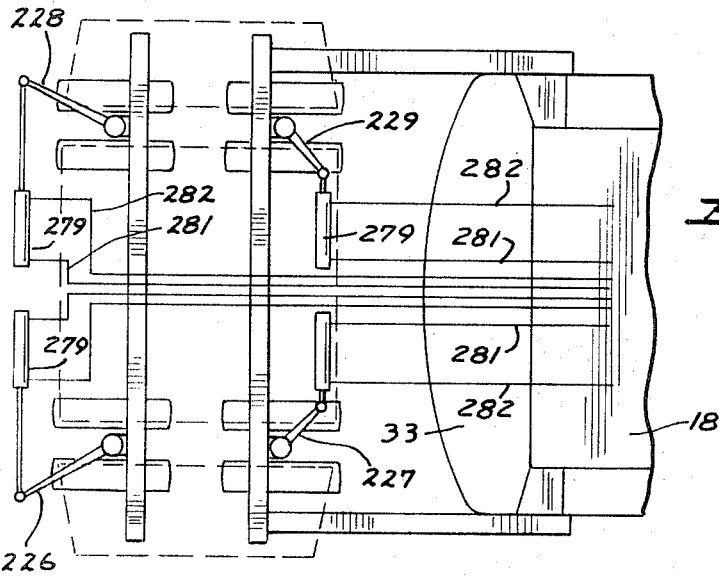

CRANE COUNTERBALANCING TRAILER ASSEMBLY

This is a continuation-in-part of application Ser. No. 102,500, filed Dec. 29, 1970; which was a continuation of application Ser. No. 767,670, originally filed Oct. 15, 1968, now abandoned.

BACKGROUND OF THE INVENTION

In order to lift heavy weights with a boom mounted on a front end of a rotatable crane deck, it has long been the practice to provide a counterweight on the deck at the rear end thereof. The limitation on the weight of the load lifted in such structures is determined by the weight of the counterweight, and the extension of the boom point away from the center of rotation of the crane deck with respect to the crane carrier or car body, for example. By increasing the weight of the counterweight, it should then be possible to increase the boom reach and the size of the load which can be lifted. However, as the counterweight is increased, the torque stresses on the point of pivotal connection between the crane deck and the car body are also increased, particularly when the crane is supporting no work load. Thus the amount of such stresses which this pivotal mounting can stand form a further practical limit on the counterweight which can be supported.

It has been suggested to provide a counterweight trailer fastened to a crane carrier or car body to lie on the nominal longitudinal axis of that car body regardless of the angular relationship of the rotatable crane deck to the car body. See the patent to Krupp, German Pat. No. 1,246,969. The same disclosure reveals a linkage attachment between the counterweight trailer and the top of a mast used to counterbalance the work load on a boom. Obviously the counterweight can only be fully effective when the mast and the boom arrangement are lying in a plane passing through the counterweight. As seen in FIG. 2 of Krupp, the boom 7 in that figure and the load 11 will be getting little support from the counterweight when the boom is positioned as seen in dotted lines in that figure.

It has been suggested that a deadweight counterweight be positioned from a mast outwardly from the rear end of a rotatable crane deck, this counterweight being, therefore, rotatable with the crane deck and the mast as the crane deck rotates to move the boom and the work load supported from the boom as desired. See DeCuir patent, U.S. Pat. No. 3,209,920. This structure necessitates that the counterweight be lifted from the ground whenever it is desired to rotate the crane deck with respect to the car body. This puts the entire torsional stress of the counterweight on the pivotal support mechanism between the crane deck and the car body when the boom is not loaded, as discussed above.

It has been suggested to extend the crane deck out beyond the movable car body and to support a wheel assembly on a vertical pivot back underneath the counterweight at the end of the crane deck. See the patent to C. Hermann, U.S. Pat. No. 3,037,643. This structure, Hermann claims, will cause the load to be supported not only by the main chassis or mobile car body wheel assemblies 3 and 14 (see FIG. 1 of Hermann), but also by the rear wheels or supporting trains 8 (best illustrated in FIG. 2). It is true that a major component of the counterweight can be supported on the rear wheel assembly or supporting train 8 when the jib 18 is unloaded. However, because of the rigidity of the platform 7 of the "control cabin" or crane deck 4 of Hermann, all stresses due to the unevenness of the supporting surface will automatically be transferred to the pivot point 5 in spite of the springs 15, and in spite of Hermann's claims to the contrary.

A structure similar to that shown in the patent to C. Hermann is shown in Russian Pat. No. 214,777, with the exception of the fact that the extension 11 of the rotatable crane deck 4 in the Russian patent is telescopically mounted on rigid frames in that crane deck structure to the end that the counterweight 13 and supporting track assembly 12 can be moved from a position close to the rotatable mounting 3 as shown in full lines to a position remote from that mounting as shown in dotted lines. Here again when the boom 6 is not carrying a load, the full weight of the counterweight 13 will be directly over the track assembly 12, but because of the rigid nature of the telescopic connection, a substantial portion of that counterweight will be transmitted as a torsional load onto the pivotal connection 3 between the crane deck 4 and the movable car body 1.

Once again, any unevenness in the terrain traversed by the counterweight supporting tracks 12 of the Russian patent will necessarily be transferred through the crane deck to pivotal connection between it and the movable car body.

BRIEF SUMMARY OF THE INVENTION

A counterbalancing trailer assembly is pivotally connected for limited vertical movement to the rear end of a crane deck of a crane which has a boom pivotally mounted thereon to lift a load adjacent the front end of that deck, has a mast pivotally mounted thereon behind the boom and has linkages for supporting the mast and boom for independent movement relative to each other and for linking an upper portion of the mast to the rear of the crane deck and to the counterweight. The crane deck is pivotally mounted to a crane carrier or car body to permit rotational movement of the crane deck with respect to the carrier about a vertical axis.

The counterbalancing trailer assembly includes a counterweight trailer for holding ballast to form a counterweight, and individual wheel assemblies which include wheel support means which can be pivotally mounted with respect to the trailer on a vertical axis to rotatably support ground engaging wheels to support the trailer on a substantially level supporting surface. These wheel support means can be rotatably moved and then held to position the ground engaging wheels either in first selected arcuate positions such that the track of the wheels over the ground will describe an arc concentric with the pivot point of the crane deck about the crane carrier, or in second selected positions whereby the wheels will rotate on axes which are mutually parallel.

In the event that the crane carrier is constituted as a movable car body having wheels, rollers or crawler tracks or the like operable to move the car body in a first direction and in the event it is desired to move the entire crane in said first direction; then the wheel support means will be rotatably moved to position the axles of the ground engaging wheels in perpendicular relationship to said first direction.

In the event that the crane carrier is stationarily mounted, or in the event that the crane carrier is a mobile car body but has been located to position the crane in proper position for use, the wheel support means will be moved to position where each of the ground engaging wheel axles lie on a separate radius passing through the center of rotation of the crane deck with respect to the crane carrier.

This alignment of the wheels can be accomplished by manual means, and mechanical means, such, for example, as spring urged lock pins, can be used to hold the wheel support means in place; or hydraulic piston-cylinder motors can be used to move the wheel support means to position the axles of the ground engaging wheels in the desired position. These hydraulic motors can also be used to releasably hold these wheel support means to so position the wheel axles.

IN THE DRAWINGS

FIG. 1 is an elevational view of an erected crane equipped with a counterbalancing trailer assembly made according to a first form of the present invention;

FIG. 2 is an enlarged fragmentary elevational view of the rear portion of the crane of FIG. 1 connected to the counterbalancing trailer assembly;

FIG. 3 is a top plan view of the counterbalancing trailer assembly and rear crane portion of FIG. 2;

FIG. 4 is a view similar to that of FIG. 3 with a ballast tank of the counterbalancing trailer assembly indicated in broken lines only and showing wheel assemblies of a counterweight trailer of the counterbalancing trailer assembly;

FIG. 5 is an enlarged fragmentary elevational view taken generally on the line 5—5 in FIG. 4, but showing the wheels of the wheel assemblies in position in transverse alignment with respect to the longitudinal axis of the crane deck;

FIG. 6 is an elevational view of the counterweight trailer of the first form of the invention seen as looking toward the rear of the crane deck, and with the rearwardmost wheel of each wheel assembly removed;

FIG. 7 is an enlarged fragmentary elevational view of one of the wheel assemblies of the counterbalancing trailer assembly as seen in FIG. 5 and showing the mount and lock structure of one wheel support means of that wheel assembly;

FIG. 12 is an enlarged fragmentary elevational view of a line length adjusting mechanism in the counterweight trailer supporting line or linkage;

FIG. 13 is an enlarged fragmentary elevational view of the rear portion of a crane similar to that seen in FIG. 2, but disclosing a counterbalancing trailer assembly made according to a second form of the invention;

FIG. 14 is a top plan view of a rear portion of a crane deck and of the counterbalancing trailer assembly of FIG. 13, but with a ballast tank of trailer assembly indicated in broken lines only to show a trailer frame and wheel assemblies;

FIG. 15 is an enlarged top plan view of the structure of FIG. 14, but with ground engaging wheels and wheel support means of the wheel assemblies shown in a position to allow the counterbalancing trailer assembly to be moved with the entire crane when the longitudinal axis of the crane deck is in alignment with the longitudinal axis of its movable car body;

FIG. 16 is a diagrammatic view of the structure of FIGS. 14 and 15, but including a schematic representation of hydraulic circuitry to power movement of the wheel support means with respect to the counterweight trailer frame;

FIG. 17 is an elevational view of the counterbalancing trailer assembly of the second form of the invention as seen looking toward the rear of the crane deck;

DESCRIPTION OF PREFERRED EMBODIMENTS

Figure 8:
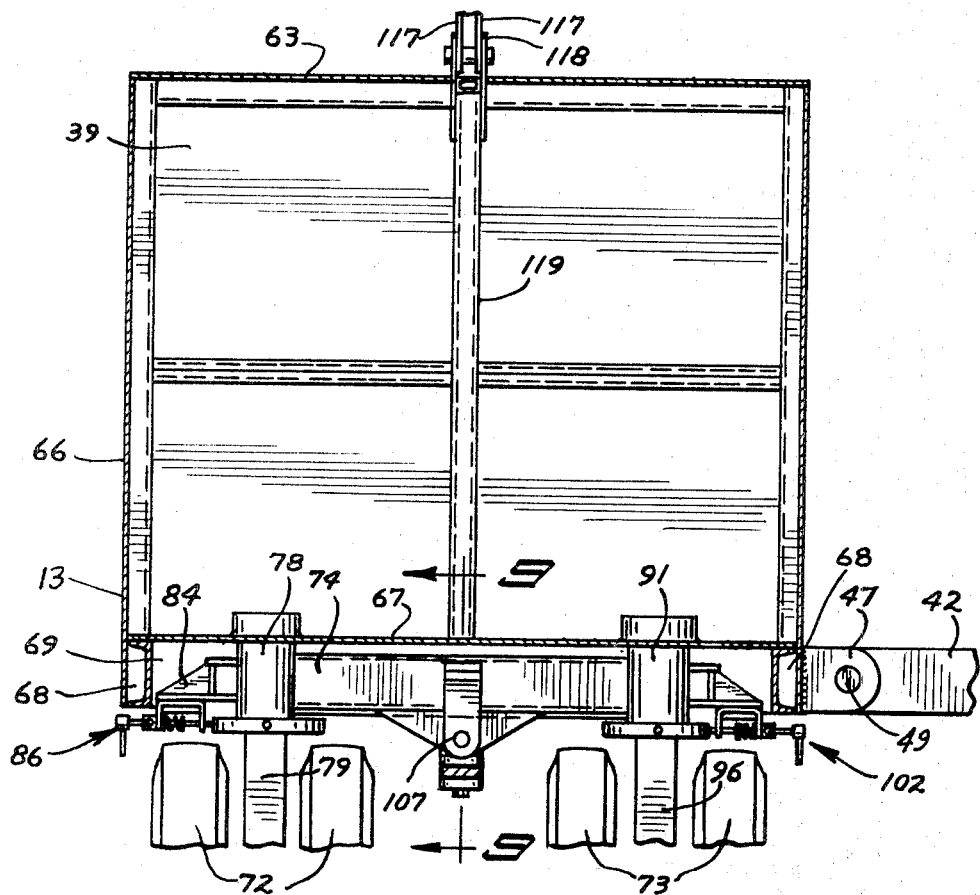
FIG. 8 is an enlarged vertical sectional view taken on the line 8—8 in FIG. 6.

As seen in FIGS. 1 through 12, a first form of counterbalancing trailer assembly 38 is attached to a crane 15 which is supported on a supporting ground surface 16; and is for the purpose of handling heavy loads at extended radii. The crane includes a movable car body 14 supporting a rotatable crane or machinery deck 18. The car body 14 includes, and is supported on the ground surface 16 by, a pair of crawler tracks 17, 17 which can be driven to move the car body in any usual or preferred manner (not shown). A long boom 19 is pivotally mounted on the deck by pivot members 21. Located rearwardly of the boom 19 is an upright mast 22 pivotally connected to the deck with pivot support members 23. In the first form of the invention as shown, the boom 19 is approximately twice as long as the mast 22. The boom and mast length combinations may be as follows:

| Mast Length | 80' | 100' | 130' | 150' | 180' |
|---|---|---|---|---|---|
| Boom Length | 150' | 200' | 250' | 300' | 350' |

Boom suspension lines 24 are connected to the outer ends of the boom 19 and the mast 22 with a connector 26 and a block 27 respectively. Boom suspension lines 24 have a control line 28 extending downwardly toward the deck and connected to a winch which is not shown (behind winch 44). These lines and fittings constitute a first adjustable linkage means 20.

Mast 22 is held in a generally upright position by mast suspension lines 31 connected at their lower end to a rear gantry support 32 extended upwardly from and secured to a counterweight 33 mounted on the rear portion of the deck 18 in the usual manner. The upper ends of the suspension lines 31 are trained over pulleys 34A. These mast suspension lines are connected to the upper end of the mast 22 by pendants 144 as indicated at 34. One of the ends of the lines 31 extends downward toward the deck and is connected to a winch (not shown) located adjacent a winch 29. These lines 31, pendants 144 and fittings constitute a second adjustable linkage means 30.

Extending along the upper side of the boom, and longitudinally of the boom, is a load line 35 connected to a winch 44 mounted on the crane or machinery deck 18. Line 35 is located over a sheave assembly 36 rotatably mounted on the top of the boom 19. Load line 35 carries a block 37 having a load hook for receiving lines and chains for connecting the block to the load. The opposite end 35A of the load line extends along the forward side of the boom 19, and longitudinally thereof, and is connected to a winch (not shown).

The counterbalancing trailer assembly 38 is connected to the back of crane deck 18 and provides additional weight to balance the load placed on the block 37. The counterbalancing trailer assembly 38 includes a counterweight trailer 13 which, as shown, has a ballast tank 39 for carrying removable ballast supported on a pair of wheel assemblies indicated generally at 41 and 41A. The ballast can be water, sand or other material capable of being stored in the tank. Preferably such material will also be capable of being removed from the tank when it is desired to transport the counterweight trailer separately from the crane. Alternatively, steel plates or concrete blocks can replace the tanks.

Coupling means including a pair of laterally projected, parallel connecting arms 42 and 42A pivotally attach the trailer assembly 38 to the crane or machinery deck 18, in a manner to be more fully described.

A pair of pendant lines 43, connected to the top of the trailer assembly 38, extend upwardly to the top of the mast 22 and are connected to that mast also as indicated at 34. Line length adjusting mechanisms, indicated generally at 40 in FIG. 12, are interposed in these pendant lines 43. These pendant lines 43 and line length adjusting mechanisms 40 including appropriate fittings constitute a third linkage means 12.

As seen in FIG. 12, each line length adjusting mechanism 40 includes a pendant fitting 134 permanently secured to one end of a pendant line 43. A wedge socket fitting 136 is adjustably secured to the other end of a line 43. Fittings 134 and 136, as shown, are connected to each other by a flat link 137 and with pins 138 and 139. Wedge socket fitting 136 has a tapered or wedge shaped passage 141 accommodating a loop 142 of pendant line 43. The tension on line 43 draws loop 142 into the socket 141 so that the fitting 136 grips and holds the pendant line 43. By changing the location of loop 142 in the pendant line, the length of line 43 can be changed to change the effective length of third linkage means 12. As a safety precaution, a wire rope clamp or clip 143 is secured around both parts of the pendant line 43 below fitting 136.

One means of effectively using the counterbalancing effect of the counterbalancing trailer assembly 38 with the crane 15 is to adjust the length of mast suspension lines 31 of the second adjustable linkage means 30 to position the upper end of the mast directly over the counterweight trailer 13, and to adjust the length of pendant lines 43 so that the third linkage means 12 will be of such length that all or a major part of the weight of the counterweight trailer will be carried by this third linkage means before a substantial fraction of the forces transmitted by the first linkage means are picked up by the second linkage means. In actual practice, this effect is achieved with the pendant lines 43 of the third linkage means 12 taut, and with the pendant lines 144 and mast suspension lines 31 taut, because the many parts of the lines 31 will stretch as the load on the block 37, acting on the boom 19 and the first linkage means 20, tends to cause the mast to pivot to pick up the weight of the counterweight 33 and the counterbalancing trailer assembly 38. The relatively inflexible third linkage means doesn't stretch as much and so initially picks up most of the load.

As perhaps best seen in FIGS. 2 and 3, mounting brackets 46 and 47 are integral with and extend outwardly from opposite end portions of the wall of ballast tank 39 adjacent the rear end portion of rotatable crane deck 18. These mounting brackets accommodate horizontal pins 48 and 49 respectively to pivotally connect outer ends of connecting arms 42 and 42A to the tank. The opposite or inner ends of these connecting arms 42 and 42A are provided with inwardly directed spacer members 51 and 52, respectively, for receiving bolts 53 and 54 respectively to pivotally mount the connecting arms to side frame portions of the rotatable crane deck 18. As shown, connecting arms 42 and 42A extend adjacent the opposite sides of the deck mounted counterweight 33. A shim 56 mounted on a bracket 57 secured to the mid-portion of arm 42 spaces that arm from the counterweight. In a similar manner, a shim 58 mounted on a bracket 59 connected to a mid-portion of arm 42A spaces that arm from the counterweight 33. Connecting arms 42 and 42A are maintained in spaced parallel relation to each other, even when transmitting rotational forces from the rotating crane or machinery deck 18 to the counterweight trailer 13, by the use of crossed tension rods 61 and 62, secured at their opposite ends to appropriate brackets or similar supports mounted on the arms 42 and 42A.

Counterweight ballast tank 39 has a top wall 63 provided with four manholes closed with manhole covers 64. Each manhole provides access into a separate compartment of the tank. As shown in FIG. 8, sidewalls 66 of the ballast tank are plate members joined to a bottom wall 67 to form the chambers for storing ballast. These sidewalls and bottom wall are secured to longitudinal frame members 68. The bottom wall 67 of each end portion of the tank includes a transverse upwardly extended, downwardly opening, channel 69 for accommodating the support and bearing structure for the wheel assemblies 41 and 41A.

As shown in FIG. 6, a storage box 71 is secured to the bottom wall 67 between the front wheel assembly 41 and the rear wheel assembly 41A.

As perhaps best seen in FIGS. 4 and 8 wheel assemblies 41 and 41A are located under ballast tank 39 of counterweight trailer 13 slightly inwardly from the longitudinal axes of connecting arms 42 and 42A, respectively. Wheel assembly 41 will now be described. Similar parts of wheel assembly 41A are identified on the drawings with the same reference numerals having the suffix A added thereto.

Wheel assembly 41 includes a horizontal transverse beam 74 of size and length to fit in the transverse channel 69 on the bottom of the ballast tank 39. Wheel support means includes upright sleeves 78 and 97 integral with and secured to opposite ends of beam 74, and vertical standards 77 and 96 rotatably mounted in these sleeves 78 and 97 respectively, and extending downwardly therefrom. The lower ends of these standards 77 and 96, respectively, include a bifurcated yoke 79 and 98, respectively, which are pivotally mounted on horizontal pins 81 and 99 respectively to wheel axles 76 and 94 which rotatably support ground engaging wheels 72, 72 and 73, 73 respectively.

Secured to the standard 77 below the sleeve 78 is a collar 82 having a plurality of circumferentially spaced holes 83. This collar cooperates with a lock assembly indicated generally at 86 to lock the standard 77 against rotation in the sleeve 78. The lock assembly 86 is secured to an outwardly directed arm 84 attached to the side of sleeve 78. Lock assembly 86 includes a pin 87 having a laterally directed handle 88. The midportion of pin 87 is slidably mounted in an inverted U-shaped bracket 89 mounted on the bottom of the arm 84. A spring 91 positioned around the pin 87 between the legs of the bracket 89 biases the pin toward the collar 82 yieldably holding the forward end of the pin 87 in one of the holes 83. A cam follower sleeve 92 secured to the bracket 89 cooperates with a transverse pin 93 on the lock pin 87 to hold the pin 87 in the released position whereby the horizontal wheel axle 76 is free to turn about the upright axis of the standard 77.

Similarly, located below sleeve 97 is a collar 101 which cooperates with a lock assembly indicated generally at 102 to releasably lock the standard 96 in a fixed angular relationship to sleeve 97 and the horizontal beam 74. Lock assembly 102 is identical to lock assembly 86 as shown in FIG. 7.

As seen in FIG. 4, the ground engaging wheels 72, 72A, 73 and 73A are positioned so that wheel axles 76, 76A, 94 and 94A are each in radial alignment with the axis of rotation of the rotatable crane deck 18 with respect to the car body 14. When so positioned, the counterbalancing trailer assembly can move freely with the crane deck as it is rotated about this upright swing axis.

With the axles 76, 76A, 94 and 94A and the ground engaging wheels 72, 72A, 73 and 73A positioned as seen in FIGS. 1, 2, and 5 through 8, for example, the counterweight trailer 13 is positioned so that it can be moved transversely away from the longitudinal axis of the crane deck 18 after connecting arms 42 and 42A have been removed. Thus the counterweight trailer can be moved to another location for use independently of the crane 15, and then reassembled therewith to again serve as a counterbalancing trailer assembly.

As indicated by the positioning of pin opening 83 exactly in the middle of ring 82 in FIG. 5, the upright stanchions 77, 77A, 96 and 96A can be rotated 90° with respect to the positions shown in FIGS. 5, 6 and 8, for example, and the locking pins 87 and the pins corresponding to the locking pins 87 will pass through the openings 83 to lock the wheels in such position. When so situated, the entire counterbalancing trailer assembly can be moved with the entire crane forwardly or rearwardly in order to move to a new work location, or for any other desired purpose.

Lock assemblies 86 and 102 can be released so that wheels 72, 72A and 73, 73A function as castor wheels whereby the counterweight trailer assembly will follow the crane when the mobile car body moves over a curved course and so the trailer can be steered when disconnected from the crane. While the lock assemblies have been shown as including positive pin brakes, friction band brakes capable of locking the standards 77 and 96 in any angular position could be employed.

Figure 9:
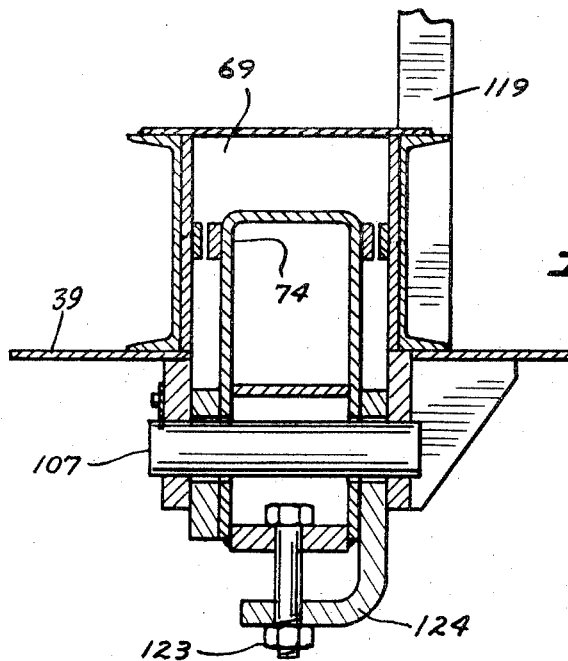
FIG. 9 is an enlarged fragmentary sectional view taken on the line 9—9 in FIG. 8.

As best seen in FIGS. 8 and 9, beam 74 fits within the channel 69 in the bottom of the ballast tank 39. Pin 107 secures and pivotally mounts this beam 74 to a midportion of the frame of the tank. Top portions of the beam and adjacent walls of the channel 69 are spaced from each other whereby the beam is free to pivot on pin 107 thus to equalize the load on all eight wheels regardless of the presence of minor irregularities in the ground surface 16. The beam 74A shown in FIG. 4 has a pair of pins to secure opposite ends of the beam to the tank bottom in a manner similar to that shown in FIG. 9. In addition, each end of the beam 74A has stops (not shown) cooperating with the tank so that the beam can support the tank. This triangular mounting of the beam 74 at its mid-point and the beam 74A at its ends to support the bottom of the tank 39, evenly distributes the load of the trailer assembly on all eight wheels.

Referring to FIG. 6, pendant trailer suspension lines 43 for supporting the tank 39 are trained over a pair of sheaves or pulleys 111 and 112. A pair of upright arms 113 pivotally connect the sheave 111 to a support bracket 114 which is secured to an upright channel member 116 which extends all the way down to the bottom wall 67 of ballast tank 39 adjacent the channel 69 which houses the wheel assembly 41A. Sheave 112 is rotatably mounted in a pair of upright arms 117 pivotally mounted to a support bracket 118, which in turn is secured to an upright channel member 119 which extends all the way down to the bottom of the tank and is secured to the mid-portion of the bottom wall 67 and the channel 69 which encompasses wheel assembly beam 74 as shown in FIG. 9. The upright members 116 and 119 transfer the lifting force to the bottom of the tank and equally distribute the lifting force throughout the tank.

Figure 10:
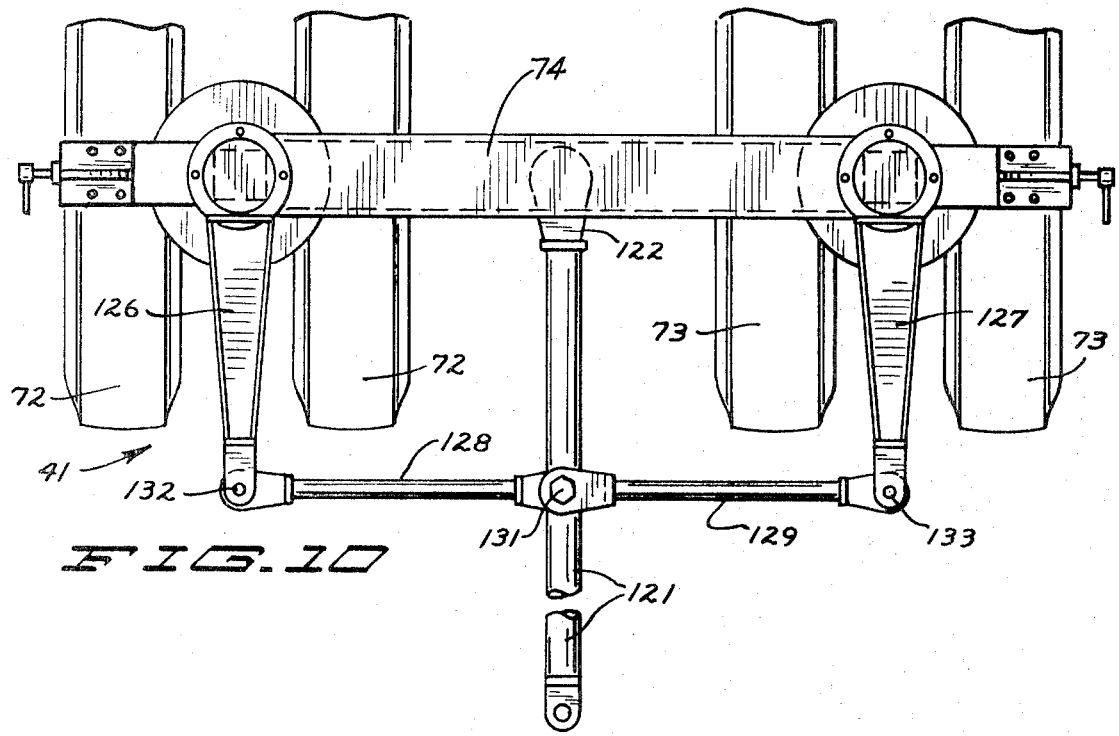
FIG. 10 is a fragmentary top plan view showing a modified form of front wheel assembly.
Figure 11:
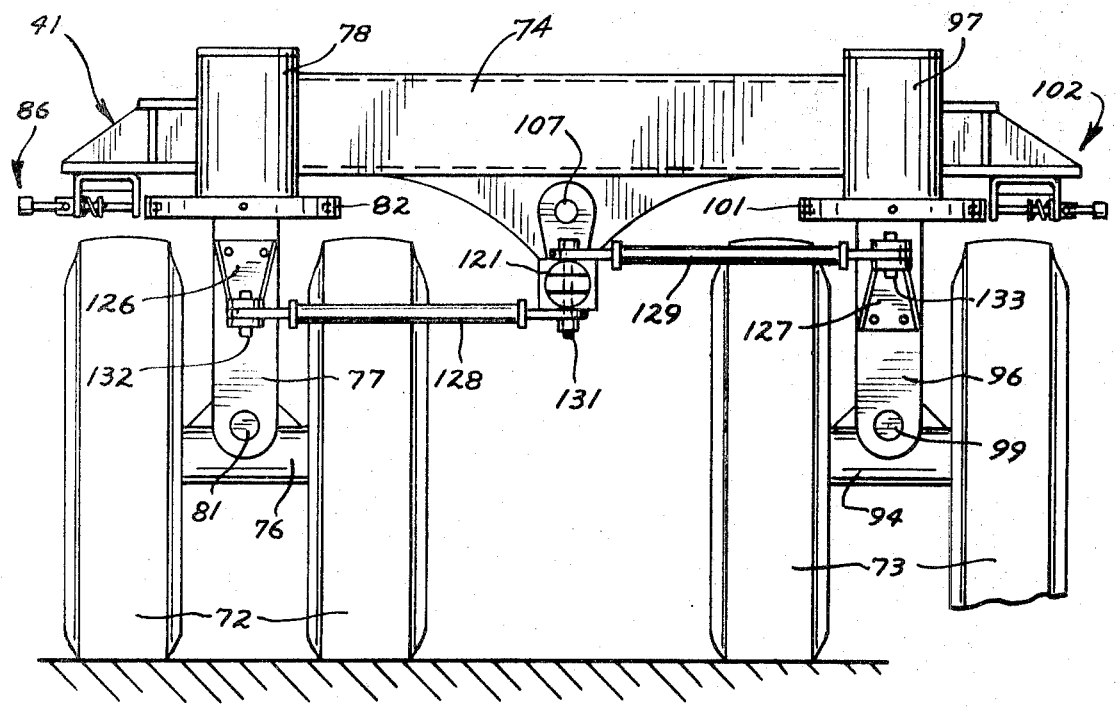
FIG. 11 is a front elevational view of the front wheel assembly of FIG. 10.

Referring to FIGS. 10 and 11, there is shown a towing attachment used to pull the counterweight trailer 38 separately from the crane 15. As shown, the front wheel assembly 41 carries a forwardly directed tow bar or tongue 121. The rear end of this bar 121 has a flat plate 122 having a hole therethrough to accommodate a bolt 123 (see FIG. 9) which secures the tow bar to a lower portion of the beam 74. As shown in FIG. 9, the bolt 123 extends through a right angle arm 124 secured to the beam 74 and attached to the tank by pin 107.

Returning to FIGS. 10 and 11, a forwardly directed arm 126 is secured to the front of the vertical standard 77 below the collar 82. This arm 126 has a forward end located forwardly of the wheels 72, 72. This forward end is pivotally connected to a mid-portion of the tow bar 121 by tie bar 128. The vertical standard 96 similarly carries a forwardly directed arm 127 which is pivotally connected to the tow bar by tie bar 129. A single pin 131 is used to pivotally secure the inner ends of the tie bars 128 and 129 to the mid-portion of the tow bar 121. The outer ends of the tie bars 128 and 129 are secured to the forward ends of arms 126 and 127 by pins 132 and 133, respectively.

To tow the counterweight trailer assembly, the lock assemblies 86 and 102 are released so that the wheels 72, 72 and 73, 73 are free to castor or rotate about the upright axes of their standards 77 and 96. The tow bar simultaneously controls the movement of the axles of the pairs of wheels 72, 72 and 73, 73 in a horizontal plane through the tie bars 128 and 129 and the forwardly directed arms 126 and 127. At this time, the rear pairs of wheels 72A, 72A and 73, 73A can either be locked in position parallel to the longitudinal center line of the tank 39 or can be left free to castor.

When the counterweight trailer assembly 38 is connected to the rear of the rotatable crane deck 18 and is to be used to counterbalance the load on the boom while the crane deck rotates on the car body 14, the vertical standards 77, 77A and 96 and 96A can be locked with respect to the upright sleeves 78, 78A and 97 and 97A to hold wheel axles 76, 76A and 94, 94A in radial alignment with the upright axis of rotation of the crane body with respect to the movable car body or crane carrier. The lock assemblies 86 and 102 are so used to hold the parts so that the ground engaging wheels will move over arcuate paths concentric with this axis of crane deck rotation as the counterweight trailer assembly rotates with the crane deck.

Referring now to FIGS. 13 through 19, a counterbalancing trailer 200 made according to a second form of the invention is pivotally connected to the rotatable crane deck or machinery deck 18 of a crane 15 in exactly the same manner as was the counterweight trailer of the first form of the invention. Therefore, identical members are used to represent the identical parts which include connecting arms 42 and 42A pivotally mounted on horizontal pivot pins 48 and 49 to mounting brackets 46 and 47 integral with the counterweight trailer assembly.

Rotatable crane deck 18 is pivotally mounted on movable car body 14 which, as shown, is supported on crawler tracks 17 on supporting ground surface 16. It could, however, be mounted on a stationary crane carrier or pedestal.

Counterweight 33 is mounted on the rear portion of the deck 18, and rear gantry support 32 extends upwardly to the second adjustable linkage means. Mast 22, boom 19, first adjustable linkage means 20, load line 35, and the third linkage means 12 are all positioned relatively as seen in FIG. 1 of the drawings, but only the pendants 43, sheaves or pulleys 111 and 112 of the third linkage means 12 are shown in FIGS. 13 through 19.

The connection of tie rods 61 and 62 and the connection of connecting arms 42 and 42A to the rotatable crane deck 18 are as shown in connection with the first form of the invention.

The counterbalancing trailer assembly 200 of the second form of the invention includes a trailer frame 201 made up of parallel, spaced apart I-beams 202 and 203 extending longitudinally of the trailer frame in transverse direction with respect to the rotatable crane deck or machinery deck 18 to which the trailer is normally fastened. These beams are fixedly mounted with respect to each other by diagonal welded braces 204 and by box beams 205 and 206 welded between the webs of the I-beams 202 and 203. The connecting arm mounting brackets 46 and 47 extend outwardly from I-beam 203.

Figure 18:
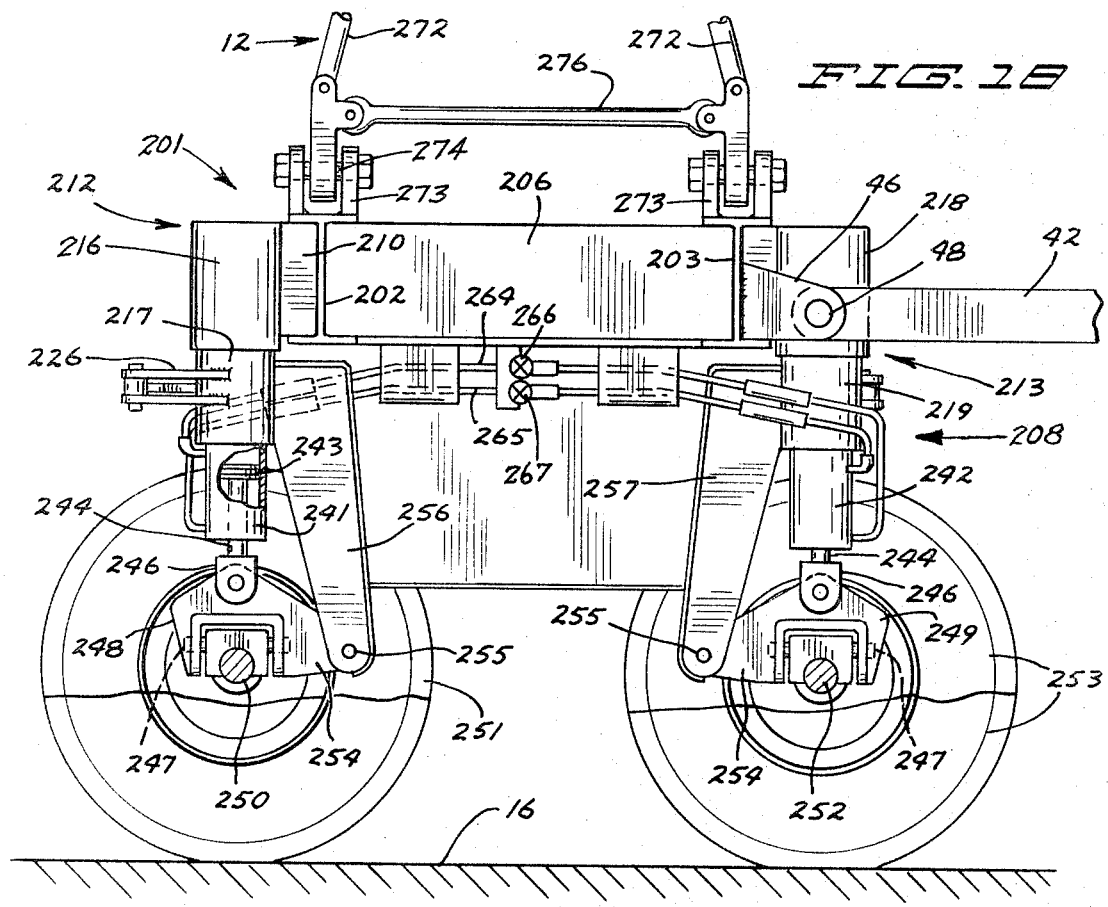
FIG. 18 is an enlarged end elevational view taken on the line 18—18 in FIG. 15 but with a fragment of the nearest ground engaging wheels broken away.

Wheel assemblies 208 and 209 can be considered as including these box beams 205 and 206 respectively, as well as welded extensions 210, 210 and 211, 211 of said box beams to the outside of the I-beams 202 and 203. To these extensions, wheel support means 212, 213, 214 and 215 are welded. As perhaps best seen to the left end of FIG. 18, wheel support means 212 includes an upright sleeve 216, integral with and welded to the transverse box beam extension 210. Rotatably mounted in this upright sleeve is a vertical standard 217 in much the same manner as set out in connection with sleeve 78 and bifurcated standard 77 in the first form of the invention, as seen in FIG. 7, for example. A similar upright sleeve 218 and vertical standard 219 are associated with the wheel assembly 208 at the right end thereof as seen in FIG. 18 to form part of wheel support means 213. Upright sleeves 222 and 224 of wheel assembly 209 support vertical, downwardly extending standards 223 and 225 respectively. Each of these standards 217, 219, 223 and 225 integrally support one of a plurality of radially outwardly extending steering arms 226 and 227, 228 and 229, respectively. Perhaps as best seen to the left of FIG. 17, downwardly extending standards 223 and 225 include lower portions 231 of reduced diameter which pivotally support wheel axles 234 as at 231, each of which rotatably support ground engaging wheels 235 and 236, respectively. The ground engaging wheels 235, 235 associated with upright sleeve 222 and downwardly extending standard 223, together with this sleeve and standard are part of the wheel support means 214. Ground engaging wheels 236, 236, upright sleeve 224, and vertical downwardly extending standard 225, together form part of wheel support means 215.

The distance between the supporting ground surface 16 and the trailer frame vertically aligned with wheel support means 214 and 215 is fixed. To insure that all four pairs of ground engaging wheels bear an equal share of the weight of the counterbalancing trailer assembly, wheel support means 212 and 213 include hydraulic cylinder-piston actuators which automatically compensate for any unevenness in the supporting surface 16 in a manner now to be described.

Referring now particularly to FIG. 18, an integral downward extension of vertical downwardly extending standard 217 is a hydraulic cylinder 241. A similar cylinder 242 is integral with and extends downwardly from standard 219. Pistons 243 are operably associated with each of the cylinders 241 and 242, and piston rods 244 extend downwardly therefrom. Each of the piston rods terminates in a yoke 246, the yoke associated with the cylinder 241 and wheel supporting means 212 is pivotally mounted to an axle housing 248; while the yoke 246 associated with cylinder 242, forming part of wheel support means 213 is pivotally connected to axle housing 249.

Axle housing 248 supports axle 250, which in turn supports ground engaging wheels 251, 251; while axle housing 249 supports axle 252, which in turn rotatably supports ground engaging wheels 253, 253. The pins between these axles and axle housings are designated 247.

Each of the axle housings 248 and 249 include steering arms 254 extending outwardly therefrom, and each of these steering arms are pivotally connected as at 255 to king pin arms 256 and 257 respectively, such king pin arms extending outwardly from upright standards 217 and 219 respectively. As will be obvious, any rotative movement imparted to upright standard 217, for example, by movement of steering arm 226 will likewise be imparted through king pin arm 256 and steering arm 254 to the axle 250 and ground engaging wheels 251, 251. Similarly motion imparted to steering arm 227 will be transmitted to axle 252 and ground engaging wheels 253. The means for moving these steering arms and also steering arms 228 and 229 will be described subsequently.

Counterbalancing trailer assembly 200 includes a counterweight trailer 258 of which trailer frame 201 is a part. This trailer also includes a counterweight which, in this form of the invention, consists of a plurality of ballast tanks, 261, 262 and 263, each supported on the I-beams 202 and 203 and the other parts of the trailer frame 201. As in the case of the ballast tank of the first form of the invention, these tanks can be removably filled with appropriate ballast, such as sand, for example. Alternatively, steel plates or concrete blocks can replace the tanks.

As explained in connection with the first form of the invention, the entire weight of the counterweight trailer, including that of the ballast tanks, is supported on the ground engaging wheels when the boom 19 is not supporting a working load. As in the first form of the invention, any irregularities in the supporting surface 16 under the ground support wheels would, if the wheels were all equal distance from the bottom of the ballast tank, cause the pairs of wheels to support unequal portions of the load, and/or would put sufficient strain on the counterweight trailer to cause the frame to be twisted. It is to alleviate this problem that the wheel support means 212 and 213 are provided with hydraulic cylinders 241 and 242 and their associated pistons and piston rods 243 and 244. The cylinder-piston actuators thus formed are double acting in nature, and the upper chambers of each are open to each other through hydraulic line 264. The lower chambers are open to each other through hydraulic line 265. Manually operable hydraulic valves 266 and 267 allow access to the upper and lower chambers of the cylinder-piston actuators for the purpose of charging them with hydraulic fluid and in order to allow any air in the lines to be bled off. In normal operation, these valves will remain closed.

Figure 19:
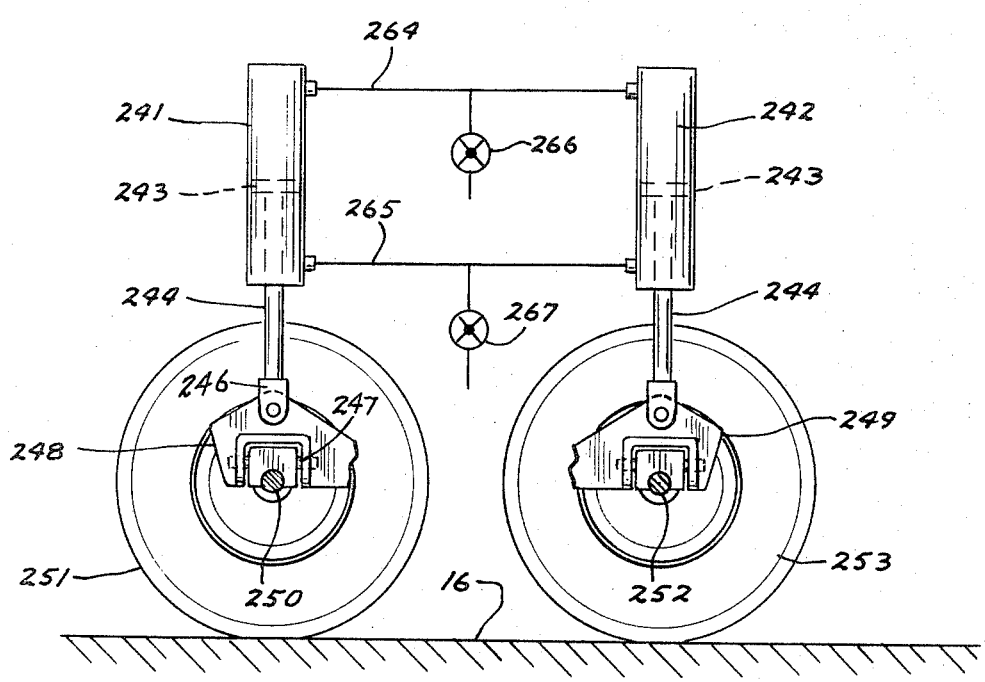
FIG. 19 is a schematic representation of equalizing wheel mounts and hydraulic circuitry for the wheel suspension system shown in FIG. 18.

As clearly seen in FIGS. 18 and 19, should any of the four sets of ground engaging wheels 235, 236, 251 and 253, or any combination of them, encounter any irregularity in supporting surface 16, either above or below the nominal level of that surface, the fixed linkages between ground engaging wheels 235, 235 and 236, 236 will cause the trailer frame to be supported in exact parallel relationship to the ground supporting surface under these wheels. The weight of the trailer on the frame over those wheels will be supported equally by each such set of wheels. At the opposite end of the trailer, whether or not ground engaging wheels 251, 251, and 253, 253 are situated in the same plane as the other sets of wheels or are situated above it or are situated below it or are situated one above and one below, the hydraulic pressure in the upper chambers of cylinders 241 and 242 and in hydraulic line 264 must be equal since the line 264 opens to both of these chambers. Similarly, the pressure in the lower chamber of cylinders 241 and 242 and in hydraulic line 265 is equal. The only way that this condition can prevail, is for each of the wheel support means 212 and 213 to bear an equal load. This can only happen when the pistons 243, and consequently the piston rods 244 have moved relatively to the trailer frame and to each other so that the ground engaging wheels exactly conform to any irregularities in the ground under them.

The pivotal supports 232 of the wheel axles 234 of ground engaging wheels 235, 235 and of ground engaging wheels 236, 236 insure that the weight on each pair of wheels is divided equally between the wheels. Similarly, the pivotal support pins 247 between the axle housings 248 and 249 on the one hand and the axles 250 and 252 on the other insure the weight is divided equally between each wheel in a pair.

Thus it will be seen that all eight wheels will bear an equal proportion of the load of the counterweight trailer 258 at all times automatically regardless of the minor irregularities in supporting ground surface 16.

In order to support the counterweight trailer effectively, as best seen in FIGS. 13, 14, 17 and 18, the sheaves 111 and 112, through which pendants 43 of third linkage means 12 are trained are rotatably supported in clevises 268 and 269 respectively. Each clevis is pivotally connected to a triangular load support plate 271 from which depend diagonally extending lift struts 272, 272. Each of these lift struts is pinned to a pair of trailer lifting ears 273, 273 as at 274. These ears 273, as best seen in FIG. 18, are integral with the trailer frame 201 at position directly over their respective I-beams 202 and 203 and immediately adjacent upright sleeves 216, 218, 222 and 224.

Spacer bars 276, 276 pinned between the bottom ends of adjacent lift struts 272, 272 assure that there are not diagonal inward forces exerted on the trailer lift ears 273, 273 and that all of the lifting action is in the vertical direction. Similarly, a spacer bar 277 pinned between clevises 268 and 269 insure that the forces acting on the pairs of triangular load support plates and lift struts is also always in the vertical plane.

As pointed out in connection with the first form of the invention, it is sometimes desirable to position the ground engaging wheels in direction transverse to the axis of the crane deck, or, in other words, parallel with the longitudinal axis of the trailer 258. This positioning of the wheels is illustrated in FIG. 13. It is also essential to be able to position the wheels so that they rotate on axes which are in exact radial alignment with the center of rotation of the crane deck about the crane carrier or mobile car body. This positioning of the wheels is illustrated in FIG. 14. Likewise in order to move the counterweight trailer of the counterbalancing trailer assembly with the movement of the movable car body, when the crane is carrying its counterbalanced load, for example, it is essential to be able to align the ground engaging wheels with the longitudinal axis of the crane deck when the crane deck is aligned with the direction of movement of the mobile car body. This positioning of the wheels is illustrated in FIGS. 15, 16, 17 and 18.

In the form of the invention as illustrated in FIGS. 13 through 18, this is accomplished by attaching cylinder-piston motors 279 between the trailer frame 201 and each of the steering arms 226, 227, 228 and 229. Appropriate hydraulic lines 281 are open from the closed end of each of the cylinders through appropriate controls to a source of hydraulic fluid under pressure (not shown). Similarly, appropriate hydraulic lines 282 extend from such a hydraulic source, through appropriate valving (not shown) to the rod ends of the cylinders of these cylinder-piston motors. The desired alignment of the ground engaging wheels can then be accomplished by actuation of the cylinder-piston actuators 279 individually or in unison according to a predetermined program, thus to cause each of the steering arms to rotate its associated upright standard to rotate the ground engaging wheel axles, as explained above. By blocking hydraulic lines 281 and 282, these wheel axles can be locked into position.

As explained in connection with the first form of the invention, the relationship between the third linkage means 12 and the second adjustable linkage means is such that, when a weight is supported by the boom 19, the third linkage means will first come into play to pick up all or substantially all of the weight of the counterbalancing trailer assembly before the second linkage means picks up the weight of the counterweight 33 and the rear of the crane deck. This makes sure there is no excessive torque load on the pivotal connection between the rotatable crane deck and the crane carrier or mobile car body.

The embodiments of the invention in which an exclusive property or privilege is claimed are defined as follows.

1. In a load lifting machine having a crane carrier supported with respect to a generally horizontal supporting surface, a crane deck rotatably mounted on a generally vertical axis with respect to said crane carrier, an upstanding mast and an upstanding boom both pivotally mounted on a forward portion of the deck for movement in a vertical plane passing through the axis of rotation of the crane deck with respect to the carrier, a first linkage between an upper portion of said mast and an upper portion of said boom, means for varying the length of said first linkage, a second linkage between an upper portion of said mast and a rear portion of said deck, means for varying the length of said second linkage, a load line extending over the point of said boom, means for rotating said deck, means for powering the load line, and a load handling device supported by the load line hanging from the point of the boom; the improvement including:
  A. an independent counterbalancing trailer assembly spaced and separated from the rear of the crane deck, said trailer assembly including: a counterweight trailer and a plurality of wheel assemblies with wheels to support the weight of the trailer assembly on said supporting surface independent of the support of the deck of the load lifting machine, said wheel assemblies including means to support said wheels so that they are capable of supporting movement of the counterbalancing trailer in an arc about the axis of crane deck rotation;
  B. coupling arms pivotally connecting the counterweight trailer to the rotatable crane deck to permit vertical movement of the trailer with respect to the deck but to cause the trailer to rotate with the deck as the deck rotates on the carrier about its generally vertical axis; and
  C. a third linkage from the counterweight trailer to the top end of the mast, whereby the length of the second linkage can be varied with respect to the length of the third linkage so that substantially the entire counterbalancing load of the counterweight trailer acts on the mast through the third linkage before further counterbalancing load is applied to the crane deck through the second linkage.

2. The structure of claim 1 wherein said crane carrier is constituted as a movable carbody and wherein said wheel assemblies each include:
  1. wheel support means mounted with respect to said trailer;
  2. a generally horizontal axle mounted below, and with respect to, each wheel support means; and
  3. a trailer support wheel rotatably mounted about each axle.

3. The structure of claim 2 wherein said wheel support means are rotatable on a vertical axis between, and fastenable at, positions where said wheel axles are in parallel alignment with the vertical plane passing through said mast and said boom, positions where said wheel axles are all in perpendicular relationship to said vertical plane, and positions wherein each wheel axle lies on a radius of the vertical deck axis.

4. The structure of claim 3 wherein each wheel support means includes a sleeve element and stantion element nested one inside the other, one such element being angularly fixedly mounted with respect to the counterweight trailer and the other such element being angularly fixedly mounted with respect to its associated wheel axle.

5. The structure of claim 4 wherein said means for holding said wheel support means in position includes a positive lock between said elements involving a locking pin on one element contacting a stop on the other.

6. The structure of claim 4 and power means for rotating the wheel axles and associated elements about said vertical wheel support axles.

7. The structure of claim 6 wherein said power means includes a plurality of cylinder-piston motors connected to rotate said stantion and sleeve elements with respect to each other.

8. The structure of claim 7 wherein said means for holding said wheel support means in position includes said cylinder-piston motors.

9. The structure of claim 2 wherein one of said wheel assemblies includes a horizontal transverse beam pivotally mounted at a midpoint thereof to said counterweight trailer and extends transversely across one end thereof, a separate wheel support means rotatably mounted at each end of the beam on a vertical axis, a horizontal axle mounted with respect to each wheel support means in spaced relation to and beneath said trailer, and at least one trailer support wheel rotatably mounted on each horizontal axle.

10. The structure of claim 2:
  A. wherein a first set of wheel assemblies includes:
    1. first and second spaced apart wheel support means each rotatably mounted on a vertical axis at an opposite side of a first end of said trailer,
    2. a horizontal axle mounted with respect to each such trailer support means in spaced relation to and beneath said trailer, and
    3. at least one trailer support wheel rotatably mounted on each such axle;
  B. wherein a second set of wheel assemblies are mounted under and support a second end of said trailer;
  C. said first and second wheel support means each including downwardly extending stantions to which the wheel axles are affixed;
  D. each such stantion having a hydraulic cylinder-piston actuator situated between said axle and the point of rotatable mounting of the wheel support means with respect to the trailer;
  E. each cylinder of each actuator defining an upper chamber situated above its piston and a lower chamber situated below said piston; and
  F. there being a closed hydraulic passage interconnecting said upper chambers and a closed hydraulic passage interconnecting said lower chambers.

* * * * *